(12) United States Patent
Ji et al.

(10) Patent No.: US 9,212,057 B2
(45) Date of Patent: Dec. 15, 2015

(54) METHOD FOR CONTROLLING FUEL REFORMER

(71) Applicants: Hyun Jin Ji, Daejeon (KR); Sang Hyeon Ha, Daejeon (KR); Sung Baek Cho, Daejeon (KR)

(72) Inventors: Hyun Jin Ji, Daejeon (KR); Sang Hyeon Ha, Daejeon (KR); Sung Baek Cho, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 353 days.

(21) Appl. No.: 13/924,766

(22) Filed: Jun. 24, 2013

(65) Prior Publication Data

US 2014/0079626 A1 Mar. 20, 2014

(30) Foreign Application Priority Data

Sep. 18, 2012 (KR) ........................ 10-2012-0103440

(51) Int. Cl.
*C01B 3/38* (2006.01)
*C01B 3/02* (2006.01)
*H01M 8/06* (2006.01)

(52) U.S. Cl.
CPC ... *C01B 3/02* (2013.01); *C01B 3/38* (2013.01); *C01B 3/382* (2013.01); *C01B 2203/0233* (2013.01); *C01B 2203/0244* (2013.01); *C01B 2203/0261* (2013.01); *C01B 2203/0283* (2013.01); *C01B 2203/044* (2013.01); *C01B 2203/066* (2013.01); *C01B 2203/085* (2013.01); *C01B 2203/0816* (2013.01); *C01B 2203/0866* (2013.01); *C01B 2203/1005* (2013.01); *C01B 2203/1023* (2013.01); *C01B 2203/1288* (2013.01); *C01B 2203/1604* (2013.01); *C01B 2203/169* (2013.01); *C01B 2203/1619* (2013.01); *C01B 2203/1695* (2013.01); *H01M 8/0618* (2013.01); *Y02E 60/521* (2013.01)

(58) Field of Classification Search
CPC .... C01B 3/00; C01B 2203/1604; C01B 3/38; C01B 3/382; C01B 2203/0233; C01B 2203/0261; C01B 2203/044; C01B 2203/066; C01B 2203/1023; C01B 2203/1619; C01B 2203/0244
See application file for complete search history.

(56) References Cited

U.S. PATENT DOCUMENTS

2002/0078628 A1* 6/2002 Okada et al. ...................... 48/76
2003/0170510 A1* 9/2003 Robb et al. ...................... 429/17
2004/0047800 A1* 3/2004 Sennoun et al. .............. 423/652

FOREIGN PATENT DOCUMENTS

| JP | 2003-217639 | 7/2003 |
|----|-------------|--------|
| JP | 2007-042610 | 2/2007 |
| JP | 2008-303099 | 12/2008 |
| KR | 10-0823515 | 4/2008 |
| WO | WO 2007/034989 | 3/2007 |

OTHER PUBLICATIONS

Office Action mailed Oct. 11, 2012 in corresponding Korean Patent Application No. 10-2012-0103440.
Notice of Allowance mailed Dec. 3, 2012 in corresponding Korean Patent Application No. 10-2012-0103440.

* cited by examiner

*Primary Examiner* — Matthew Merkling
(74) *Attorney, Agent, or Firm* — Ostrolenk Faber LLP

(57) ABSTRACT

A method for controlling a fuel reformer, capable of generating hydrogen by reforming fuel, comprises: heating a catalyst of the fuel reformer by operating an electric heater formed to enclose the catalyst; supplying fuel and air to the catalyst under a condition of complete combustion; flame-combusting the fuel by igniting an ignition plug installed near a rear end of the catalyst; and shifting the position of the flame combustion to inside of the catalyst, by reducing a supply amount of the fuel and the air, such that temperature of the catalyst is drastically increased.

10 Claims, 4 Drawing Sheets

METHOD FOR CONTROLLING FUEL REFORMER

CROSS-REFERENCE TO RELATED APPLICATIONS

Pursuant to 35 U.S.C. §119(a), this application claims the benefit of earlier filing date and right of priority to Korean Application No. 10-2012-0103440, filed on Sep. 18, 2012, the contents of which is incorporated by reference herein in its entirety.

BACKGROUND OF THE DISCLOSURE

1. Field of the Disclosure

The present disclosure relates to a fuel reformer, and particularly, to a method for controlling a fuel reformer, which is capable of allowing a catalyst of the fuel reformer to reach a starting temperature within a shortest time.

2. Background of the Disclosure

A fuel cell indicates an energy conversion apparatus capable of directly converting chemical energy into electric energy, by a chemical reaction between fuel (hydrogen) and an oxidant (oxygen), through a reverse reaction of a water electrolysis. Hydrogen gas supplied to an anode of the fuel cell is divided into hydrogen ions and electrons through a catalyst. Then, the hydrogen ions move to a cathode of the fuel cell through an electrolyte, and the electrons move to the cathode through an external circuit. Oxygen gas supplied to the cathode is dissociated into oxygen atoms through a catalyst. Then, the oxygen atoms react with the hydrogen ions which have moved through the electrolyte, and the electrons which have moved through the external circuit, thereby generating water.

According to a type and an operation principle of an electrolyte, the fuel cells may be largely categorized into alkali fuel cells, phosphoric acid fuel cells, polymer electrolyte membrane fuel cells (PEMFC), direct methanol fuel cells, molten carbonate fuel cells (MCFC), and sold oxide fuel cells (SOFC). In case of the PEMFC, a polymer membrane such as nafion is used as an electrolyte, and the polymer electrolyte membrane fuel cell smoothly operates when the electrolyte contains a large amount of water. Therefore, hydrogen and oxygen are supplied to a fuel cell stack in a humidified state so that the relative humidity is about 100%. The polymer electrolyte membrane is provided with water from gas supplied to a reactant (reaction material).

Most of fuel cells including polymer electrolyte membrane fuel cells use hydrogen as fuel. However, there is a limitation in adopting fuel cells using hydrogen in the current situation where hydrogen supply is not sufficient. Accordingly, required is a transitional system capable of using a fuel cell after generating hydrogen by reforming hydrocarbon fuels such as natural gas, ethanol, gasoline and diesel. A fuel cell system being currently developed is mounted with a fuel reformer due to such reasons.

A driving method of the fuel reformer may include steam reforming, partial oxidation reforming and auto-thermal reforming. The steam reforming is a method for acquiring hydrogen through an endothermic (heat absorption) reaction between fuel and steam. The steam reforming is advantageous in that a yield of hydrogen is excellent. However, such method is disadvantageous in that heat should be continuously supplied from outside. The partial oxidation reforming is a method for acquiring hydrogen through an exothermic reaction between gasoline fuel and oxygen. In case of the partial oxidation reforming, a yield of hydrogen is lower than in case of the steam reforming. However, the partial oxidation reforming is advantageous in that additional heat supply from outside is not required. The auto-thermal reforming is advantageous in that a reactor can be designed more effectively as both of the steam reforming and the partial oxidation reforming are used. Accordingly, in case of a fuel cell system which is driven in an independent manner, it is advantageous to adopt an auto-thermal reforming method capable of rapidly performing a starting operation and requiring no additional heat supply from outside.

After a catalyst of an auto-thermal reforming (ATR) reactor reacts with hydrocarbon fuels, the hydrocarbon fuels are decomposed to generate a gas group containing a large amount of hydrogen. Generally, the generated gas consists of hydrogen, carbon monoxide, carbon dioxide, nitrogen, steam, etc. Among such gases, the carbon monoxide causes a polymer electrolyte membrane fuel cell (PEMFC) not to normally operate, by poisoning a platinum catalyst of the PEMFC. Therefore, carbon monoxide generated after a reaction should be removed to 10 ppm through an additional reactor. Generally, a fuel reformer reduces the amount of carbon monoxide to 1% using a water gas shift (WGS) reactor, and reduces the carbon monoxide to 10 ppm through a preferential oxidation reaction (PROX or selective catalytic oxidation). Considering such features, most of fuel cells are provided with an auto-thermal reforming reactor (which can be replaced by a steam reforming reactor and a partial oxidation reforming reactor in some cases), a WGS reactor and a PROX reactor.

There are two types of catalysts used in a fuel reformer. A pellet type catalyst is implemented in the form of grains of ceramic. On the other hand, a monolith type catalyst is implemented coated on cells of a ceramic supporter. The pellet type catalyst is mainly used in a home fuel cell system due to its low production cost. On the other hand, the monolith type catalyst is mainly used in a mobile fuel cell system due to its excellent environment-resistance (vibrations/impacts).

In order for an auto-thermal reforming (ATR) reactor to start a fuel reforming reaction, temperature of a catalyst should be increased up to about 200~300° C. This is called a starting temperature of a catalyst. Such starting temperature may be variable according to a fuel type. Once the temperature of the catalyst of the ATR reactor is increased up to 200~300° C., reactants are supplied to the catalyst to induce an exothermic reaction. Once the ATR reactor starts to perform an exothermic reaction, a larger amount of heat may be generated than in a case using an electric heater. By using such gas of high temperature, a WGS reactor and a PROX reactor may be heated up to a target temperature. For rapid start-up, a fuel reformer should be designed so that temperature of a catalyst of an auto-thermal reforming reactor can be quickly increased, and then an exothermic reaction can be performed.

The most general method for increasing a catalyst temperature is using heating wires mounted to outside of a case of a reactor. In case of a pellet type catalyst, a heat transfer coefficient is small because a main material of the catalyst is ceramic. Accordingly, it takes a lot of time for heat supplied from external heating wires to be transferred up to inside of the laminated pellet type catalyst. In case of a monolith type catalyst, it takes less time for heat supplied from external heating wires to be transferred up to inside of the catalyst, than in the case of the pellet type catalyst. However, it is difficult to anticipate rapid heat transfer, because an insulator is disposed between the monolith catalyst and the case in order to fix the monolith catalyst into the case.

Another method for increasing temperature of a catalyst inside a reactor is to insert heating wires into a region near the catalyst mounted to inside of a case of the reactor. In this case, time taken for a catalyst temperature to be increased can be more reduced than in the case using the aforementioned method. However, the inner structure of the reactor may become complicated and the fabrication costs may be increased, because the heating wires should be inserted into the reactor through the case. Further, in case of using the heating wires, an excessive amount of electric energy is required.

A method for heating a catalyst within the shortest time is to heat the catalyst by combustion. A fuel cell system is provided with fuel for driving a reactor. Accordingly, a catalyst temperature can be easily increased by merely adding an apparatus for combusting the fuel. Generally, combustion heat has thermal energy much higher than that generated from an electric heater, so that a catalyst can be heated more rapidly. Fuel reformers which have been developed so far have a structure that a combustion space is provided at an upper end of a catalyst, and the catalyst undergoes temperature rising by combustion gas or combustion flame of high temperature. To this end, an ignition plug for igniting fuel is positioned at an upper end of the catalyst. More specifically, flame combustion occurs from the upper end of the catalyst, thereby rapidly increasing temperature of the catalyst. However, such method has the following problems. Firstly, the catalyst may be drastically thermally-deteriorated due to thermal impacts. Further, soot may be absorbed to the surface of the catalyst when incomplete combustion occurs. This may degrade performance of the catalyst.

SUMMARY OF THE DISCLOSURE

Therefore, an aspect of the detailed description is to provide a method for controlling a fuel reformer capable of allowing a catalyst of the fuel reformer to reach a starting temperature within a shortest time using less power.

To achieve these and other advantages and in accordance with the purpose of this specification, as embodied and broadly described herein, there is provided a method for controlling a fuel reformer, the method comprising: heating a catalyst of the fuel reformer by operating an electric heater formed to enclose the catalyst; supplying fuel and air to the catalyst under a condition of complete combustion; flame-combusting the fuel by igniting an ignition plug installed near a rear end of the catalyst; and shifting the position of the flame combustion to inside of the catalyst, by reducing a supply amount of the fuel and the air, such that temperature of the catalyst is drastically increased.

According to an embodiment of the present invention, the step of supplying may be performed when the temperature of the catalyst is 80~100° C.

According to another embodiment of the present invention, under the condition of complete combustion, an air-fuel ratio, which indicates the mass ratio of air to fuel present in an internal combustion engine, may be 12~18.

According to still another embodiment of the present invention, the method for controlling a fuel reformer, may further comprise: removing the flame combustion, by stopping the supply of the fuel and the air when the temperature of the catalyst is increased to a value more than a preset temperature; and supplying the fuel and the air by changing the condition of complete combustion, into a condition of a preferential oxidation reactionor an auto-thermal reforming reaction.

The preset temperature may be 200~300° C. The step of removing the flame combustion may comprise stopping the operation of the electric heater.

Under the condition of a preferential oxidation reaction, an air-fuel ratio may be lower than under the condition of complete combustion.

The step of supplying may be performed such that the auto-thermal reaction is performed after the preferential oxidation reaction.

The temperature of the catalyst may be measured by a first thermocouple contact-installed on an outer circumferential surface of the catalyst. Temperature of the fuel which has passed through the catalyst may be measured by a second thermocouple installed near a rear end of the catalyst.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a method for controlling a fuel reformer according to the present invention will be explained in more detail with reference to the attached drawings.

Figure 1:
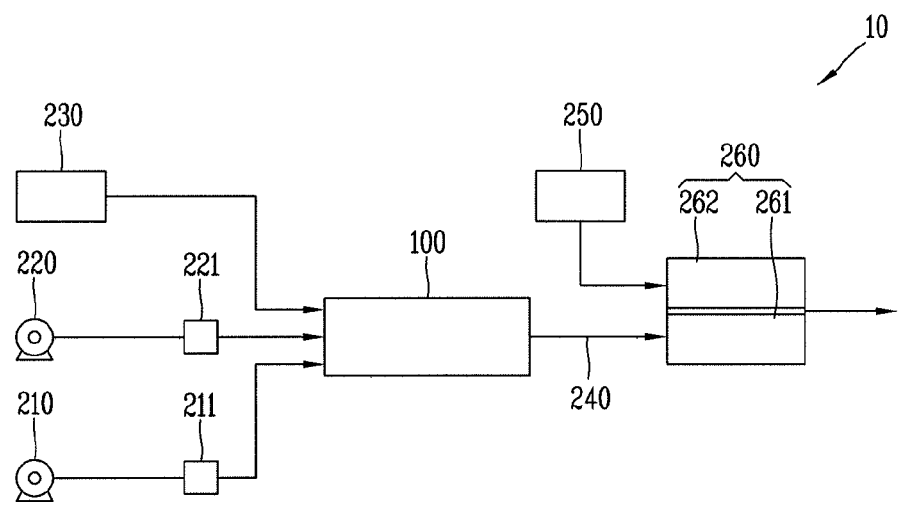
FIG. 1 is a conceptual view illustrating a fuel cell system according to an embodiment of the present invention.

FIG. 1 is a conceptual view illustrating a fuel cell system 10 according to an embodiment of the present invention.

A fuel reformer 100 is connected to each of a fuel pump 210 configured to supply fuel for reaction, a water pump 220 configured to supply water for reaction, and a blower 230 configured to supply air for reaction. Fuel and water, which are supplied from the fuel pump 210 and the water pump 220, respectively, are evaporated through evaporators 211 and 221, to thus be supplied to the fuel reformer 100. The vaporizers 211 and 221 may be provided in the fuel reformer 100, and may be configured to evaporate (vaporize) fuel and/or water using heat generated from the fuel reformer 100.

The fuel reformer 100 may comprise an auto-thermal reforming (ATR) reactor 110, a water gas shift (WGS) reactor, and a preferential oxidation (PROX or selective catalytic oxidation) reactor. Hereinafter, a structure of the ATR reactor 110, and a control method thereof will be explained. Detailed explanations about the WGS reactor and the PROX reactor will be omitted for convenience. The structure of the ATR reactor 110 and the control method thereof may be applied to a steam reforming reactor and a partial oxidation reforming reactor. Hereinafter, the ATR reactor 110 will be referred to as reactor 110, for convenience.

A large amount of hydrogen, which is generated from the fuel reformer 100, is supplied to an anode 261 of a fuel cell stack 260 through a fuel pipe 240. Oxygen is supplied to a cathode 262 through an air blower 250. The fuel cell stack 260 is configured to generate electricity through an electrochemical reaction between hydrogen and oxygen.

Figure 2:
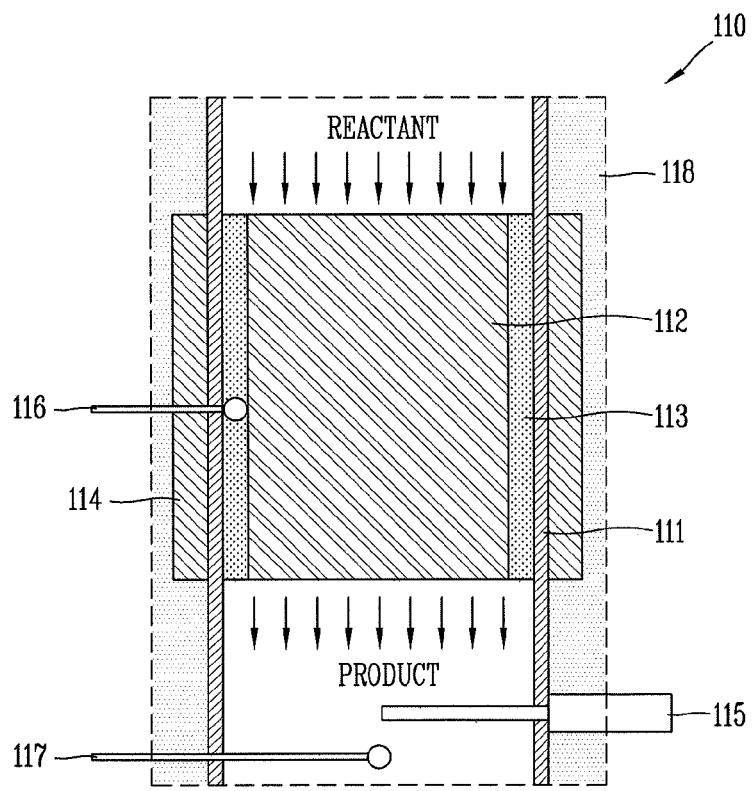
FIG. 2 is a sectional view of a fuel reformer of FIG. 1.

FIG. 2 is a sectional view of the reactor 110 of the fuel reformer 100 of FIG. 1.

The reactor 110 comprises a case 111, an internal insulator 113, an electric heater 114, an ignition plug 115, a first thermocouple 116 and a second thermocouple 117.

The case 111 may be formed of a metallic material, and may be filled with a catalyst 112. A reactant (reaction material) is supplied to one side of the reactor 110 to thus pass through the catalyst 112. Then, the reactant is discharged as a product.

The catalyst 112 is provided in the case 111. The catalyst 112 used in the fuel reformer 100 has two types, a pellet type and a monolith type. In the present invention, the reactor 110 is filled with a monolith type catalyst 112.

The monolith type catalyst 112 comprises a supporter having a plurality of cells, and a catalyst filled in the plurality of cells. The supporter may be formed of a ceramic material. The monolith type catalyst 112 is suitable for a mobile fuel cell system due to its excellent environment-resistance characteristic (vibration/impact). Further, the monolith type catalyst 112 has advantages that pressure loss is small and temperature control is easy.

The internal insulator 113 is mounted in the case 111 so as to enclose the supporter. The internal insulator 113 is configured to support the catalyst 112, and to shield heat transferred from the catalyst 112.

An electric heater 114 is mounted outside the case 111 to heat the case 111. The electric heater 114 is configured to increase temperature of the catalyst 112 provided in the case 111. In drawings of the present invention, the electric heater 114 is formed to enclose the catalyst 112.

An external insulator 118 may be disposed to enclose the case 111. The external insulator 118 is configured to insulate the reactor 110 by shielding heat transfer by conduction and convection. The external insulator 118 may be fixed to the case 111 using an insulating tape, a wire, a tin plate, etc. The external insulator 118 may be formed to absorb vibrations or impacts transferred from outside.

The ignition plug 115 is installed in the reactor 110 so as to flame-combust fuel inside the reactor 110. In drawings of the present invention, the ignition plug 115 is installed near a rear end of the catalyst 112. Such design is implemented in order to prevent the catalyst 112 from being damaged by soot generated during initial ignition, as explained later.

The first thermocouple 116 is installed on an outer circumferential surface of the catalyst 112, and is configured to measure temperature of the catalyst 112. The second thermocouple 117 is installed near a rear end of the catalyst 112, and is configured to measure temperature of fuel which has passed through the catalyst 112, i.e., a product.

Hereinafter, a method for controlling the fuel reformer 100, capable of allowing the catalyst 112 to reach a start-up temperature within a shortest time using small power, will be explained in more detail.

Figure 3:
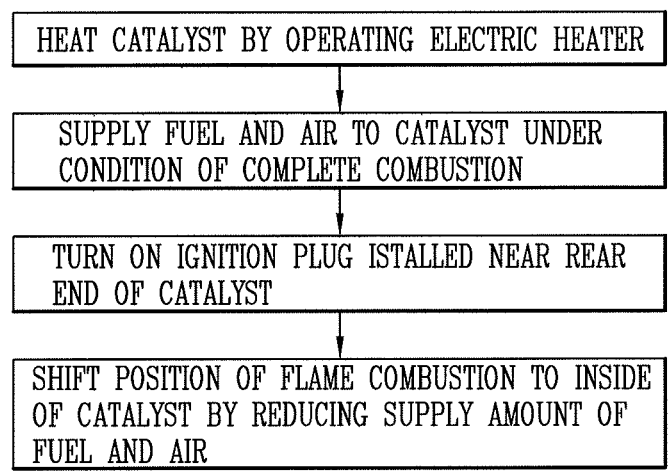
FIG. 3 is a flowchart illustrating a method for starting up (initially-driving) a reactor of FIG. 2.
Figure 4A:
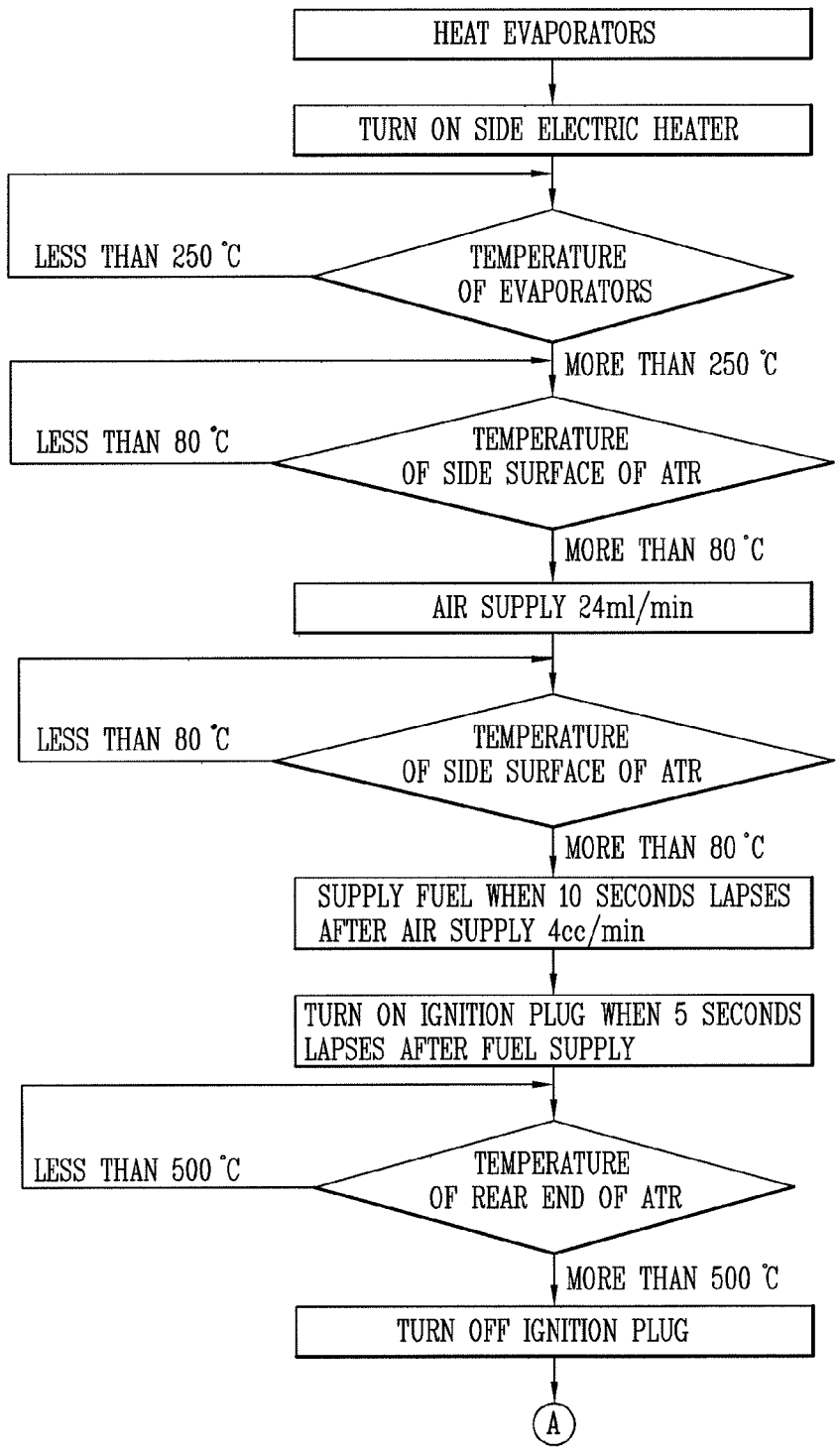
FIGS. 4A and 4B are flowcharts illustrating an example of the starting-up method of FIG. 3.
Figure 4B:
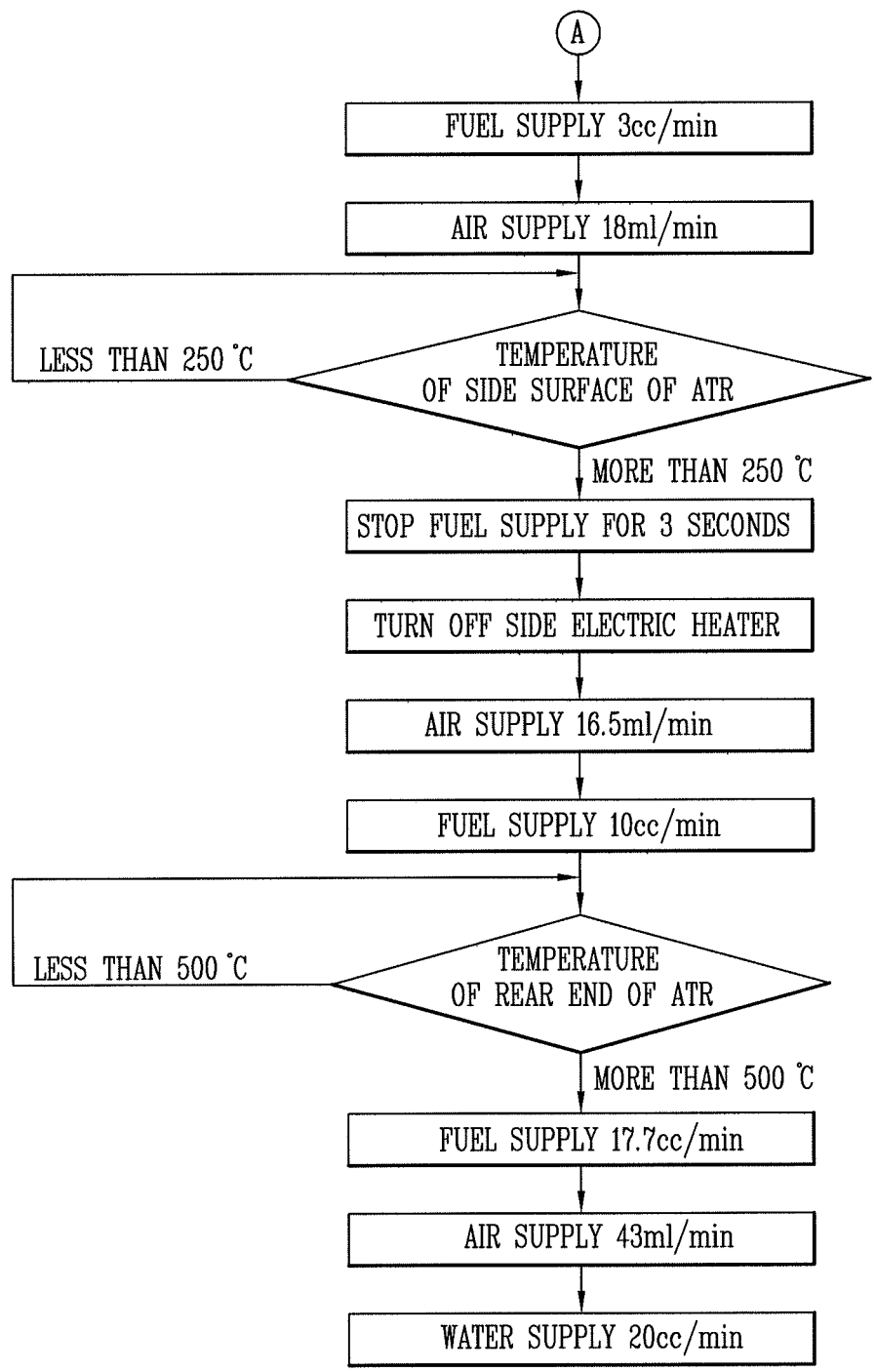

FIG. 3 is a flowchart illustrating a method for starting up (initially-driving) the reactor 110 of FIG. 2, and FIGS. 4A and 4B are flowcharts illustrating an example of the starting-up method of FIG. 3.

Referring to FIGS. 3 and 4 with the aforementioned drawings, once a controller (not shown) instructs a starting command, power is supplied to thermal lines installed at the evaporators 211 and 221. The power may be continuously supplied until temperature of the evaporators 211 and 221 reaches a preset temperature (e.g., 250° C.).

At the same time, power is also supplied to the electric heater 114 which encloses the catalyst 112, thereby heating the catalyst 112. The electric heater 114 is configured to heat the catalyst 112 until a side surface temperature of the catalyst 112 measured by the first thermocouple 116 (i.e., a side surface temperature of an ATR (Auto-Thermal Reforming) reactor becomes 80° C. The reason why the catalyst 112 is heated up to 80° C. is in order to prevent fuel evaporated through the evaporators 211 and 221, from being re-condensed on the surface of the catalyst 112.

Once the two conditions (temperature of the evaporators 211 and 221 is 250° C., and temperature of the catalyst 112 is 80° C.) are satisfied, the blower 230 operates. Then, fuel and air are supplied to the reactor 110 as a reactant. The fuel and the air may be supplied to the catalyst 112 under a condition of complete combustion. For instance, an air-fuel ratio, which indicates the mass ratio of air to fuel present in an internal combustion engine, may be 12~18, a condition of complete combustion. Referring to FIG. 4A, air is supplied to the reactor 110 with a flow rate of 24 ml/min, and fuel is supplied to the reactor with a flow rate of 4 cc/min after time lapse of 10 seconds.

The ignition plug 115 is mounted to the reactor 110, so that fuel supplied to the reactor 110 with air can immediately combust. Preferably, the ignition plug 115 is installed near a rear end of the catalyst 112, so that the catalyst 112 can be prevented from being damaged by soot generated during initial ignition. Once the fuel starts to flame-combust at the rear end of the catalyst 112 by ignition of the ignition plug 115, an inner temperature of the reactor 110, which is measured by the second thermocouple 117, drastically increases.

If temperature of the rear end of the catalyst 112, i.e., temperature of the rear end of the ATR, is more than a preset temperature (500° C.) as the flame combustion is continuously performed, the operation of the ignition plug 115 is stopped, and the controller controls the supply amount of the fuel and the air to be decreased. Referring to FIG. 4B, fuel is supplied to the reactor 110 with a flow rate of 3 cc/min, and air is supplied to the reactor 110 with a flow rate of 18 ml/min. As the supply amount of the fuel and the air is decreased, the position where the flame combustion is performed is shifted to inside of the catalyst 112, from the rear end of the catalyst 112. Here, the air-fuel ratio may be constantly maintained.

Once the flame combustion occurs in the catalyst 112, temperature of the catalyst 112 reaches a target temperature (e.g., 200~300° C.) within several seconds. Then, the controller temporarily stops the fuel supply to prevent the flame combustion from being performed any longer. If the flame combustion is performed for a long time, not only the catalyst 112 but also other components or another reactor connected to the rear end of the catalyst 112 may be damaged by overheat. Here, the operation of the electric heater 114 may be stopped.

If the controller determines that the flame combustion has stopped, the fuel and the air are supplied to the reactor under a condition of a preferential oxidation reaction or an auto-thermal reforming reaction, not under the condition of complete combustion. Under the condition of a preferential oxidation reaction, an air-fuel ratio is lower than under the condition of complete combustion. Referring to FIG. 4B, fuel is supplied to the reactor with a flow rate of 10 cc/min, and air is supplied to the reactor with a flow rate of 16.5 ml/min.

Under the condition of complete combustion, hydrogen is not generated through the auto-thermal reforming reactor. However, under the condition of a preferential oxidation reaction, a large amount of hydrogen is generated through a catalysts reaction. If steam has been prepared in this state, fuel and air can be supplied to the reactor with the steam, thereby immediately starting an auto-thermal reforming reaction. However, it takes a lot of time for water to evaporate. Therefore, a preferential oxidation reaction is firstly performed, and then an auto-thermal reforming reaction is performed after steam is prepared. Referring to FIG. 4B, fuel is supplied to the reactor with a flow rate of 17.7 cc/min, air is supplied to the reactor with a flow rate of 43 ml/min, and water is supplied to the reactor with a flow rate of 20 cc/min.

In the present invention, consumption of electric energy can be reduced because temperature of the catalyst 112 can be increased to a prescribed level using the electric heater 114. Then, the flame combustion can be induced to inside of the catalyst 112 to drastically increase the temperature of the catalyst 112 to a start-up temperature. Under such configuration, the fuel reformer can be started up within a shorter time than in the conventional art.

Further, in the present invention, the conventional problems caused by using a combustor mounted to an upper end of the reactor 110 without using the electric heater 114, e.g., drastic degradation of the catalyst 112, absorption of soot by the catalyst 112, etc. can be solved. This can enhance durability of the catalyst 112.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a fuel reformer capable of generating hydrogen by reforming fuel, the method comprising:
    heating a catalyst of the fuel reformer by operating an electric heater formed to enclose the catalyst;
    supplying fuel and air to the catalyst under a condition of complete combustion;
    flame-combusting the fuel by igniting an ignition plug installed near a rear end of the catalyst; and
    shifting the position of the flame combustion to inside of the catalyst, by reducing a supply amount of the fuel and the air, such that temperature of the catalyst is drastically increased.

2. The method of claim 1, wherein the step of supplying is performed when the temperature of the catalyst is 80~100° C.

3. The method of claim 1, wherein under the condition of complete combustion, an air-fuel ratio is 12~18.

4. The method of claim 1, further comprising:
    removing the flame combustion, by stopping the supply of the fuel and the air when the temperature of the catalyst is increased to a value more than a preset temperature; and
    supplying the fuel and the air by changing the condition of complete combustion, into a condition of a preferential oxidation reaction or an auto-thermal reforming reaction.

5. The method of claim 4, wherein the preset temperature is 200~300° C.

6. The method of claim 4, wherein the step of removing the flame combustion comprises stopping the operation of the electric heater.

7. The method of claim 4, wherein under the condition of a preferential oxidation reaction, an air-fuel ratio is lower than under the condition of complete combustion.

8. The method of claim 4, wherein the step of supplying is performed such that the auto-thermal reaction is performed after the preferential oxidation reaction.

9. The method of claim 4, wherein the temperature of the catalyst is measured by a first thermocouple contact-installed on an outer circumferential surface of the catalyst.

10. The method of claim 9, wherein temperature of the fuel which has passed through the catalyst is measured by a second thermocouple installed near a rear end of the catalyst.

* * * * *